Patented Nov. 4, 1952

2,616,782

UNITED STATES PATENT OFFICE 2,616,782

PRODUCTION OF SODIUM CYANIDE

Gordon A. Cain, New York, N. Y., and John B. Chatelain, Freeport, Tex., assignors to Freeport Sulphur Company, New York, N. Y., a corporation of Delaware No Drawing. Application August 16, 1950, Serial No. 179,876

13 Claims. (Cl. 23—79)

1

This invention relates to the production of sodium cyanide and more particularly to the production of such product in a substantially pure state by the direct neutralization of caustic soda with impure hydrogen cyanide gas.

Sodium cyanide has heretofore been produced by this general procedure and the sodium cyanide powder obtained by subjecting the reaction product to a relatively expensive purification treatment and to evaporation under vacuum, is still ordinarily in a more or less impure state. The inability to obtain a pure product directly in the conventional prior process is due in part to the fact that towards the end of the neutralization process polymerization and partial decomposition takes place. This unavoidable decomposition not only degrades the quality of the final product but it also causes a loss of hydrogen cyanide values to the process. The decomposition and resultant darkening of the product may be avoided by permitting a substantial amount of the caustic soda to remain in the reaction solution but when this expedient is employed the sodium cyanide content of the final product amounts to only about 90%.

An object of the present invention is to produce sodium cyanide in a substantially pure, undarkened condition from caustic soda and hydrogen cyanide by a simple, inexpensive, practical procedure.

A source of hydrogen cyanide gas available for the production of sodium cyanide is produced by the catalytic reaction of hydrocarbons, air and nitrogen-containing compounds, suitable processes, for example, being described in the United States Patents No. 1,934,838, No. 1,957,749 and No. 2,105,831. However, when such hydrogen cyanide gases are employed for the production of sodium cyanide from caustic soda by conventional operations, the product is of low quality due to contamination. It has now been determined that the contamination is due in part to the formation of sodium carbonate through the reaction of sodium hydroxide with carbon dioxide contained in the hydrogen cyanide reactor gases.

According to prior practice the contaminated sodium cyanide solutions have been purified by adding to the solution a quantity of alcohol to precipitate out the sodium cyanide, the crystals formed thereafter being dried under vacuum.

2

This operation involves unnecessarily high costs due to the expensive operations required including those for the recovery of the alcohol from the caustic solution, the reuse of the alcohol being necessary for economic reasons. The inevitable loss of some of the alcohol also adds to the cost of the operation.

Another object of the invention is to produce sodium cyanide in a reaction of a character which will permit the preparation of the sodium cyanide in substantially pure form without the use of any expensive reagent or process step.

Broadly considered, the process of the invention involves reacting caustic soda with hydrogen cyanide gases containing carbon dioxide as an impurity under procedures which prevent the formation of any appreciable amount of sodium carbonate during the reaction. Through this procedure the decomposition or the polymerization of the hydrogen cyanide with its darkening effect and the loss of cyanide values can be substantially eliminated, and at the same time, a product of high purity obtained.

Specifically, the prevention of the formation of the sodium carbonate is accomplished in accordance with the present invention by suspending an oxygen compound of calcium in the caustic soda solution to be used and, under certain conditions hereinafter described, also conducting the neutralization under controlled temperature conditions. Either lime or calcium hydroxide may be suspended in the caustic soda, the former being preferred. When either of the said calcium compounds are employed under the conditions herein described, it reacts with the carbon dioxide in the gases treated and forms calcium carbonate. This insoluble compound together with any unreacted lime or calcium hydroxide are thereafter separated from the sodium cyanide solution by any suitable means as by simple filtration. If it is desired that the sodium cyanide be prepared in powder form, the solution may be subjected to evaporation under reduced pressure.

To prevent any contamination with sodium carbonate the amount of the calcium compound employed must be at least chemically equivalent to the quantity of carbon dioxide present in the hydrogen cyanide reactor gases treated. Superior results are obtained when the calcium compound is used in substantial excess, best results ordinarily being obtained when a one hundred per cent excess over the theoretical amount is used.

The process of the present invention is capable of producing very high quality sodium cyanide with maximum utilization of the sodium hydroxide provided the process is carried out at a temperature lower than about 150° F. Since the neutralization reaction is exothermic, the maintenance of such temperature must be accomplished by some cooling means employed in conjunction with the apparatus used for the reaction.

Superior results are also facilitated by the initial use of concentrated sodium hydroxide solutions of maximum practical concentration. Through employment of such solutions the solubility of the calcium compounds present is reduced and of equal importance the amount of water that has to be evaporated to produce a dry sodium cyanide product is kept at a minimum. By cooling the reaction mass and maintaining the same at a temperature at which substantially no sodium carbonate is formed, simple filtration and evaporation will produce the sodium cyanide in substantially pure condition.

A series of conducted tests, recorded in the table below, reveal clearly the effect of the addition of lime to the caustic soda solution, the effect of reducing the temperature and the effect of the caustic concentration on the conversion efficiencies. In the tests the hydrogen cyanide reactor gases used were produced catalytically and contained hydrogen cyanide, water, carbon dioxide, carbon monoxide, ammonia, methane and nitrogen. The reactor gas was bubbled through the caustic soda solutions or the caustic soda-lime solutions, all of which were maintained constantly at the temperatures indicated.

was increased from 41 to 46% and the same temperature was used (169° F.) none of the sodium hydroxide was converted to sodium carbonate. Runs 5 and 6 reveal that when the temperature was permitted to rise to 196° F., the use of more concentrated caustic solution eliminated the conversion of sodium hydroxide to sodium carbonate when lime was present in the reacting solution.

The data of the above table and that obtained by other qualitative and quantitative tests indicate (1) that when lime is added to the sodium hydroxide or caustic soda solution the percentage of the sodium hydroxide neutralized before polymerization begins, increases as the concentration of the sodium hydroxide in the original solution is increased, (2) that the percentage of sodium hydroxide which can be converted to sodium cyanide is much higher at low temperatures when lime is present, but that at elevated temperatures the beneficial effect decreases, (3) that to produce the highest quality sodium cyanide with the maximum conversion of sodium hydroxide it is necessary to operate at a temperature lower than about 150° F. when lime is added to the caustic soda solution, and (4) that it is advisable to employ as highly concentrated sodium hydroxide solutions as is practical.

*Example*

As a source of hydrogen cyanide reactor gases containing carbon dioxide as an impurity, methane, ammonia and air were reacted by passage through a platinum-iridium screen catalyst, the resulting gas having the following analysis, percentages being given by volume:

| | Per cent |
|---|---|
| HCN | 6.0 |

| Run No. | Condition | Temp., °F. | Percent NaOH In Orig. Soln. | Percent NaOH | | | Calculated Dry Product Analysis | | |
|---|---|---|---|---|---|---|---|---|---|
| | | | | Converted to NaCN | Converted to $Na_2CO_3$ | Not Converted | NaCN | NaOH | $Na_2CO_3$ |
| 1-a | No Lime | 140 | 41 | 86.5 | 11.5 | 2.0 | 86.0 | 1.6 | 12.4 |
| 1-b | Lime | 140 | 41 | 98.3 | 0 | 1.6 | 98.7 | 1.3 | 0.0 |
| 2-a | No Lime | 140 | 47 | 87.4 | 12.7 | 0.0 | 86.5 | 0.0 | 13.5 |
| 2-b | Lime | 140 | 46 | 100.0 | 0.0 | 0.0 | 100.0 | 0.0 | 0.0 |
| 3-a | No Lime | 169 | 41 | 91.8 | 10.7 | 0.0 | 89.0 | 0.0 | 11.9 |
| 3-b | Lime | 169 | 41 | 88.3 | 3.0 | 8.7 | 89.5 | 7.2 | 3.3 |
| 4-a | No Lime | 169 | 47 | 89.2 | 10.3 | 0.4 | 88.6 | 0.3 | 11.1 |
| 4-b | Lime | 169 | 46 | 89.3 | 0.0 | 10.8 | 91.0 | 9.0 | 0.0 |
| 5 | do | 196 | 41 | 85.0 | 6.2 | 8.8 | 85.9 | 7.3 | 6.8 |
| 6 | do | 196 | 46 | 85.6 | 0 | 14.3 | 88.0 | 12.0 | 0.0 |

Runs Numbers 1-a, 2-a, 3-a, and 4-a following prior known procedures show that a substantial percentage of the sodium hydroxide was converted into sodium carbonate, whether temperature conditions were maintained at 140° F. or permitted to increase to 169° F. and that this result was obtained even when the sodium hydroxide solution was highly concentrated (47% strength). Run No. 1-b using lime in accordance with the present invention in which the temperature was maintained at 140° F. shows that no sodium hydroxide was converted to sodium carbonate, and that the resulting product contained a substantially higher percentage of NaCN than when lime was not used. Run No. 3-b shows that when the temperature was permitted to rise to 169° F. at the same initial sodium hydroxide concentration as No. 1-b (41%) a portion of the sodium hydroxide was converted to sodium carbonate. Run 4-b reveals that when the sodium hydroxide concentration

| | Per cent |
|---|---|
| $NH_3$ | 2.0 |
| $CO_2$ | 0.2 |
| CO | 4.4 |
| $CH_4$ | 0.5 |
| $O_2$ | 0.1 |
| $N_2$ | 56.3 |
| Water vapor | 23.0 |
| $H_2$ | 7.5 |

This gas mixture having a temperature of about 300° F. was contacted with a 47% caustic soda solution containing initially about .06 mol of calcium hydroxide suspended therein per mol of sodium hydroxide, by passing the same through a scrubbing tower, the ratio of the reactants being 1 mol of hydrogen cyanide gas per 1.0 mol of sodium hydroxide in the solution. Throughout the tower the temperature of the solution was maintained below about 150° F. by removing a portion of the solution from the trays, cooling it and reintroducing it into the next lower tray in the tower. When the solution reached the bottom of the tower it was continuously flowed to a filtering apparatus wherein the calcium carbonate and unreacted lime were removed. The aqueous solution of the sodium cyanide filtrate was then evaporated to dryness following conventional procedures. The resulting hydrogen cyanide was pure white in color, contained 98% NaCN, 0.1% $Na_2CO_3$, 0.3% $H_2O$ and 1.6% NaOH. It is evident that the recovery of hydrogen cyanide as sodium cyanide was substantially 100%.

Although the invention has been described herein as employing only caustic soda for the neutralization of the hydrogen cyanide, other alkali metal hydroxides may be used, as potassium hydroxide, for equivalent results can be obtained by their employment. In the place of the oxide or hydroxide of calcium, there may be employed the corresponding oxygen compounds of other alkaline earth metals capable of preventing the formation of any substantial amount of sodium carbonate by reacting with and forming insoluble compounds from the carbon dioxide in the reactor gases. The instant process is not only applicable to the treatment of the hereinbefore specifically mentioned gases but also to any other hydrogen cyanide gases containing carbon dioxide, as for example, coke oven gases and hydrogen cyanide gases made by treating impure sodium cyanide with acid.

It should be understood that the present invention is not limited to the details of procedure and conditions herein described except where specifically indicated, that other hydrogen cyanide gas mixtures and other methods of contacting the sodium hydroxide and the hydrogen cyanide gas can be used and that the scope of the invention is to be determined by the terms of the claims appended hereto.

We claim:

1. A process for the production of sodium cyanide in substantially pure condition from hydrogen cyanide gases containing carbon dioxide as an impurity which comprises, contacting said gases with a concentrated caustic soda solution containing an oxidic calcium compound selected from the group consisting of lime and calcium hydroxide suspended therein in an amount at least substantially chemically equivalent to the quantity of carbon dioxide in the impure hydrogen cyanide gases treated, maintaining the reaction mass at a temperature not exceeding 196° F., whereby the carbon dioxide reacts with the oxidic calcium compound and the hydrogen cyanide reacts with the sodium hydroxide forming sodium cyanide, and separating from said reaction solution the calcium carbonate formed and any excess oxidic calcium compound present.

2. A process for the production of sodium cyanide in substantially pure condition from hydrogen cyanide gases containing carbon dioxide as an impurity which comprises, contacting said gases with a concentrated caustic soda solution containing an oxidic calcium compound selected from the group consisting of lime and calcium hydroxide suspended therein in an amount at least substantially chemically equivalent to the quantity of carbon dioxide in the impure hydrogen cyanide gases treated, cooling the reacting mass and maintaining the same at a temperature not exceeding 150° F. at which substantially no sodium carbonate is formed, and separating from the sodium cyanide reaction solution the calcium carbonate formed and any excess oxidic calcium compound present.

3. A process for the production of sodium cyanide in substantially pure condition from hydrogen cyanide gases containing carbon dioxide as an impurity which comprises, contacting said gases with a caustic soda solution of at least 40% strength containing an oxidic calcium compound selected from the group consisting of lime and calcium hydroxide suspended therein in an amount at least chemically equivalent to the quantity of carbon dioxide present in the impure hydrogen cyanide gases treated, cooling the reacting mass and maintaining the same at a temperature not exceeding 196° F. at which substantially no sodium carbonate is formed, and separating from the sodium cyanide reaction solution the calcium carbonate formed and any excess oxidic calcium compound present.

4. A process for the production of sodium cyanide in substantially pure condition from hydrogen cyanide gases containing carbon dioxide as an impurity which comprises, contacting said gases with a concentrated caustic soda solution containing lime suspended therein in an amount at least chemically equivalent to the quantity of carbon dioxide present in the impure hydrogen cyanide gases treated, maintaining the reaction mass as a temperature not exceeding 196° F., and separating from the sodium cyanide reaction solution the calcium carbonate formed and any excess lime present.

5. A process for the production of sodium cyanide in substantially pure condition from hydrogen cyanide gases containing carbon dioxide as an impurity which comprises, contacting said gases with a concentrated caustic soda solution containing an oxidic calcium compound selected from the group consisting of lime and calcium hydroxide suspended therein in an amount in substantial excess of that which is chemically equivalent to the quantity of carbon dioxide present in the impure hydrogen cyanide gas treated, cooling the reaction mass and maintaining the same at a temperature not exceeding 196° F. at which substantially no sodium carbonate is formed and separating from the sodium cyanide reaction solution the calcium carbonate formed and the excess oxidic calcium compound present.

6. A process for the production of sodium cyanide in substantially pure condition from hydrogen cyanide gases containing carbon dioxide as an impurity which comprises, contacting said gases with a concentrated caustic soda solution containing lime suspended therein in an amount at least substantially chemically equivalent to the quantity of carbon dioxide in the impure hydrogen cyanide gases treated, maintaining the reaction mass at a temperature below 150° F. and separating from the sodium cyanide reaction solution the calcium carbonate formed and any excess lime present.

7. A process for the production of sodium cyanide in substantially pure condition from hydrogen cyanide gases containing carbon dioxide as an impurity which comprises, contacting said gases with a caustic soda solution of at least 40% strength containing lime in an amount at least chemically equivalent to the quantity of carbon dioxide present in the impure hydrogen cyanide gas treated, maintaining the reaction mass at a temperature below 150° F. and separating from the reaction solution the calcium carbonate formed and any excess lime present.

8. A process for the production of sodium cyanide in substantially pure condition from hydrogen cyanide gases containing carbon dioxide as an impurity which comprises, contacting said gases with a concentrated caustic soda solution containing lime in an amount in substantial excess of that which is chemically equivalent to the quantity of carbon dioxide present in the impure hydrogen cyanide gas treated, maintaining the reaction mass at a temperature not exceeding 196° F., and separating from the sodium cyanide reaction solution the calcium carbonate formed and the excess lime.

9. A process for the production of sodium cyanide in substantially pure condition from hydrogen cyanide gases containing carbon dioxide as an impurity which comprises, contacting said gases with a concentrated caustic soda solution containing an oxidic calcium compound selected from the group consisting of lime and calcium hydroxide in an amount of about 100% in excess of that which is chemically equivalent to the quantity of carbon dioxide present in the impure hydrogen cyanide gas treated, cooling the reaction mass and maintaining the same at a temperature not exceeding 196° F. at which substantially no sodium carbonate is formed and separating from the sodium cyanide reaction mixture the calcium carbonate formed and the excess oxidic calcium compound present.

10. A process for the production of sodium cyanide in substantially pure condition from hydrogen cyanide gases containing carbon dioxide as an impurity which comprises, contacting said gases with a concentrated caustic soda solution containing lime in an amount in substantial excess of that which is chemically equivalent to the quantity of carbon dioxide present in the impure hydrogen cyanide gas treated, maintaining the reaction mass at a temperature below 150° F. and separating from the sodium cyanide reaction solution the calcium carbonate formed and the excess lime present.

11. A process for the production of sodium cyanide in substantially pure condition from hydrogen cyanide gases derived by catalytically reacting a hydrocarbon, air and a nitrogen-containing compound which comprises, contacting such gases with a concentrated caustic soda solution containing an oxidic calcium compound selected from the group consisting of lime and calcium hydroxide, in an amount at least substantially chemically equivalent to the quantity of carbon dioxide in the impure hydrogen cyanide gases treated whereby carbon dioxide in the reactor gases reacts with the oxidic calcium compound forming calcium carbonate and the hydrogen cyanide reacts with the sodium hydroxide forming sodium cyanide, maintaining the reaction mass at a temperature not exceeding 196° F., and separating from the sodium cyanide solution the calcium carbonate formed and any excess of oxidic calcium compound present.

12. A process for the production of sodium cyanide in substantially pure condition from hydrogen cyanide gases derived by catalytically reacting a hydrocarbon, air and nitrogen-containing compound which comprises, contacting such gases with a concentrated caustic soda solution containing lime in an amount at least chemically equivalent to the quantity of carbon dioxide present in the reactor gases treated, cooling the reacting mass and maintaining the same at a temperature not exceeding 196° F. at which substantially no sodium carbonate is formed, and separating from the sodium cyanide reaction solution the calcium carbonate formed and any excess lime present.

13. A process for the production of sodium cyanide in substantially pure condition from hydrogen cyanide gases derived by catalytically reacting a hydrocarbon, air and nitrogen-containing compound which comprises, contacting such reactor gases with a concentrated caustic soda solution containing lime in an amount at least chemically equivalent to the quantity of carbon dioxide present in the reactant gas mixture treated, maintaining the reaction mass at a temperature below 150° F. and separating from the sodium cyanide reaction solution the calcium carbonate formed and any excess lime present.

GORDON A. CAIN.
JOHN B. CHATELAIN.

REFERENCES CITED

The following references are of record in the file of this patent:

UNITED STATES PATENTS

| Number | Name | Date |
|--------|------|------|
| 1,531,123 | Mittasch | Mar. 24, 1925 |